United States Patent
Guo et al.

(10) Patent No.: US 11,913,972 B2
(45) Date of Patent: Feb. 27, 2024

(54) LADCP AND USBL COMBINED OBSERVATION DEVICE AND APPLICATION METHOD THEREOF

(71) Applicant: First Institute of Oceanography, Ministry of Natural Resources, Qingdao (CN)

(72) Inventors: Jingsong Guo, Qingdao (CN); Xin Zhou, Qingdao (CN); Zhixin Zhang, Qingdao (CN); Dapeng Qu, Qingdao (CN)

(73) Assignee: First Institute of Oceanography, Ministry of Natural Resources, Qingdao (CN)

( * ) Notice: Subject to any disclaimer, the term of this patent is extended or adjusted under 35 U.S.C. 154(b) by 7 days.

(21) Appl. No.: 17/947,159

(22) Filed: Sep. 18, 2022

(65) Prior Publication Data
US 2023/0116865 A1    Apr. 13, 2023

(30) Foreign Application Priority Data
Oct. 12, 2021    (CN) .......................... 202111185148.3

(51) Int. Cl.
*G01P 5/24*   (2006.01)
*G01S 15/60*  (2006.01)
*G01S 15/88*  (2006.01)
*B63B 21/20*  (2006.01)

(52) U.S. Cl.
CPC .............. *G01P 5/241* (2013.01); *G01S 15/60* (2013.01); *G01S 15/88* (2013.01); *B63B 21/20* (2013.01)

(58) Field of Classification Search
CPC .......... G01P 5/241; G01S 15/60; G01S 15/88; B63B 21/20
USPC .......................................................... 367/90
See application file for complete search history.

(56) References Cited

FOREIGN PATENT DOCUMENTS

| CN | 201885992 U   | 6/2011 |
|----|---------------|--------|
| CN | 208567967 U   | 3/2019 |
| CN | 110057365 A   | 7/2019 |
| CN | 110263075 A   | 9/2019 |
| JP | 2015004610 A  | 1/2015 |

*Primary Examiner* — Daniel L Murphy
(74) *Attorney, Agent, or Firm* — Nitin Kaushik

(57) ABSTRACT

Disclosed is a LADCP and USBL combined observation device and a use method thereof. The device includes a cable winch system, a mounting frame, a LADCP system, a USBL beacon and a correction system. The LADCP system, the USBL beacon and the correction system can be mounted to the mounting frame by adopting a hardware support platform. The cable winch system can drive the LADCP system to deploy or recover along a vertical section. The LADCP system is used to obtain the current velocity of a single small profile, and the USBL beacon can locate the underwater position information, and the correction system can obtain data information in the seawater where the mounting frame is located, so as to calculate an absolute current velocity according to the velocity obtained by the LADCP system and the current data obtained by the correction system.

9 Claims, 5 Drawing Sheets

LADCP AND USBL COMBINED OBSERVATION DEVICE AND APPLICATION METHOD THEREOF

CROSS-REFERENCE TO RELATED APPLICATIONS

The application claims priority to Chinese patent application No. 202111185148.3, filed on Oct. 12, 2021, the entire contents of which are incorporated herein by reference.

FIELD OF TECHNOLOGY

The present invention relates to the technical field of marine monitoring equipment, in particular to a LADCP and USBL combined observation device and an application method thereof.

BACKGROUND

Among the related technologies of calculating current velocity by LADCP (Lowered Acoustic Doppler Current Profiler), LADCP is usually bundled with CTD (Conductivity-Temperature Depth Profiler), and rises and falls together with CTD underwater unit, and descends from the sea surface to the seabed at a certain speed, and then rises from the seabed to the sea surface, thus obtaining a series of single velocity profiles. These small velocity profiles need post-data processing and overlapping calculation to obtain the velocity profiles at the whole measured depth.

The velocity of single profile is the velocity of seawater relative to LADCP instrument. To get the absolute velocity of seawater, it is necessary to obtain the velocity of LADCP. Since LADCP will move in water with the hull and water flow, it is difficult to give the moving speed of the LADCP. The existing solution provides reference speed for calculating the moving speed of LADCP according to the ship speed during operation, or the LADCP speed near the bottom tracking part, or the speed measured by the upper shipborne LADCP. There are some errors in the existing calculation methods of LADCP velocity, so the velocity of LADCP can not be given accurately and objectively.

The existing velocity calculation solutions usually use LADCP to calculate the current velocity, but the velocity of LADCP can not be given accurately, which leads to large error and inaccuracy in the calculation of current velocity.

SUMMARY

The purpose of the present invention is to provide a LADCP and USBL combined observation device and a using method thereof, so as to alleviate the technical problem that the moving speed of LADCP cannot be accurately given in the prior art, resulting in large calculation error of current velocity.

The present invention provides a LADCP and USBL combined observation device for installation on a research vessel, including:
a LADCP system for obtaining a current velocity of a single small profile; USBL beacons for locating underwater position information; a mounting frame; a cable winch system for driving the mounting frame deep to seabed in a vertical direction to drive the LADCP system to deploy or recover along a vertical profile; and a correction system for obtaining information on data in seawater in which the mounting frame is located, to calculate an absolute current velocity based on the current velocity obtained by the LADCP and current data obtained by the correction system, wherein the LADCP system, the USBL beacon and the correction system are mounted to the mounting frame, the cable winch system is arranged on the research vessel, and the cable winch system is connected to the mounting frame.

In a preferred embodiment of the present invention, the correction system includes a conductivity-temperature depth profiler mounted to the mounting frame and configured for measuring a temperature value, a salinity value and a water depth value of a seawater profile of the mounting frame during deployment and recovery processes; and
an inertial navigation system mounted to the mounting frame and configured for measuring a rotation angle of the LADCP system during the deployment and recovery processes.

In a preferred embodiment of the present invention, the LADCP and USBL combined observation device further includes
a plurality of water samplers respectively mounted to the mounting frame and configured for sampling seawater at a plurality of depth positions.

In a preferred embodiment of the present invention, the water samplers include a plurality of water bottles and a water sampling controller configured for adjusting sequential opening of each water bottle so as to sample seawater at the plurality of depth positions through the plurality of water bottles,
the plurality of water bottles being connected to the water sampling controller, respectively.

In a preferred embodiment of the present invention, the mounting frame includes a load-bearing head connector and a fixing bracket, as well as an inertial navigation system mounting fixture, an upper launch LADCP mounting fixture, a water sampling controller mounting base, a water bottle mounting base, a lower launch LADCP mounting fixture, a conductivity-temperature depth profiler mounting base and a USBL beacon mounting fixture mounted inside the fixing bracket;
the load-bearing head connector is located at an end portion of the fixing bracket, and the cable winch system is connected to the fixing bracket through the load-bearing head connector;
two groups of the LADCP system are provided, and the two groups of LADCP systems are mounted to the upper launch LADCP mounting fixture and the lower launch LADCP mounting fixture, respectively;
the inertial navigation system is mounted to the inertial navigation system mounting fixture, the conductivity-temperature depth profiler is mounted to the conductivity-temperature depth profiler mounting base, and the USBL beacon is mounted to the USBL beacon mounting fixture;
a number of the water bottle mounting bases is identical to the number of the water bottles, a plurality of water bottle mounting bases are uniformly arranged along a circumference of the fixing bracket, the water bottles is vertically mounted to the water bottle mounting bases, and inlets of the water bottles opened at one end of the fixing bracket close to the load-bearing head connector, the water sampling controller mounting base is located at one end of the fixing bracket close to the load-bearing head connector, and the water sampling controller is mounted to the water sampling controller mounting base so that the water sampling controller is connected to the inlets of the water bottles.

In a preferred embodiment of the present invention, the fixing bracket includes a first mounting bracket, a second mounting bracket, a third mounting bracket and a frame connector;

the first mounting bracket, the second mounting bracket and the third mounting bracket are sequentially connected through the frame connector, and the first mounting bracket is connected to the load-bearing head connector;

the inertial navigation system mounting fixture is located in the middle of the first mounting bracket, and the upper launch LADCP mounting fixture and the USBL beacon mounting fixture are respectively located at two sides inside the first mounting bracket;

the water sampling controller mounting base is located in the middle of the second mounting bracket, and the water bottle mounting bases are uniformly arranged along the circumferential direction of the second mounting bracket;

the lower launch LADCP mounting fixture and the conductivity-temperature depth profiler mounting base are located inside the third mounting bracket, and the lower launch LADCP mounting fixture and the upper launch LADCP mounting fixture are arranged correspondingly along a vertical direction.

In the preferred embodiment of the present invention, the LADCP and USBL combined observation device further includes a counterweight; and the mounting frame further comprises a counterweight mounting stem arranged inside the third mounting bracket, the counterweight is mounted to the counterweight mounting stem, and the counterweight is configured for balancing a position of the counterweight mounting stem arranged inside the mounting frame.

In a preferred embodiment of the present invention, the cable winch system includes a winch, a cable, a telescopic crane, a driving end, a guide ring and a bearing head;

two ends of the cable are respectively connected to the winch and the bearing head, and the bearing head is connected to the mounting frame;

the winch, the telescopic crane and the driving end are all located on the research vessel, one end of the telescopic crane is connected to the guide ring, the driving end is connected to one end of the telescopic crane close to the guide ring, an arrangement direction of the telescopic crane is the same as an extension direction of the cable, the driving end is configured to drive the telescopic crane to move reciprocally to drive the guide ring to extend out of a deck of the research vessel, the guide ring is connected to the cable, and the cable is configured to be vertically arranged in seawater along with the guide ring.

In a preferred embodiment of the present invention, the present invention also includes a telescopic mechanism and a transducer array;

the transducer array is connected to a side of the research vessel near the seawater through the telescopic mechanism, the telescopic mechanism is configured for adjusting a position of the transducer array in the seawater, and the transducer array is configured for positioning to obtain position information of the USBL beacon under water.

The present invention provides a method of applying the LADCP and USBL combined observation device, including:

assembling the LADCP and USBL combined observation device;

testing a cable winch system, a LADCP system, a USBL beacon, a conductivity-temperature depth profiler and an inertial navigation system;

completing the test;

starting a dynamic positioning system of the research vessel so that a hull of the research vessel is in a state of unchanged position and direction;

actuating the telescopic rod to extend a transducer array to an operating state;

starting the cable winch system to release the LADCP and USBL combined observation device to a position of 50 meters underwater;

testing positioning and communication data information between transducer array and USBL beacon, and testing data quality of the LADCP system, the conductivity-temperature depth profiler, the inertial navigation system and the water sampling controller;

deploying the LADCP and USBL combined observation device with a descending speed ranging from 20 to 60 m/min after completing the test;

stopping descending until the device is deployed to a position 50 meters from seabed, where the LADCP system collects ground tracking data for 5 minutes, and then recovering the device;

controlling, by the water sampling controller, a plurality of water bottles to sample water in layers during the recovering;

recovering the LADCP and USBL combined observation device above sea surface, driving the LADCP and USBL combined observation device to be recovered to a deck of the research vessel, recovering the telescopic rod, and shutting down a dynamic positioning system of the research vessel; and aggregating USBL positioning data, LADCP current data, sound velocity profile data derived from the conductivity-temperature depth profiler and angle data of the inertial navigation system for data processing.

The present invention provides a LADCP and USBL combined observation device for installation on a research vessel, the device includes a cable winch system, a mounting frame, a LADCP system, a USBL beacon and a correction system. The LADCP system, USBL beacon and correction system can be mounted to the mounting frame by adopting hardware support platform and are arranged on the research vessel by using the cable winch system. The cable winch system is connected to the mounting frame and can drive the LADCP system to go deep into the seabed along the vertical section, thereby driving the LADCP system to be deployed or recovered along the vertical section. Specifically, the LADCP system is used to obtain the current velocity of a single small profile, and the USBL beacon can locate the underwater position information, and the correction system can obtain data information in the seawater where the mounting frame is located, so as to calculate an absolute current velocity according to the velocity obtained by the LADCP system and the current data obtained by the correction system. The moving speed of that LADCP is accurately given, the accuracy of ocean current speed calculation is improved. The present invention alleviates the technical problem in the prior art that a moving speed of the LADCP system cannot be accurately given, resulting in large calculation error of current velocity.

BRIEF DESCRIPTION OF THE DRAWINGS

In order to more clearly illustrate specific embodiments of the present invention or technical solutions in the prior art, the following will briefly introduce the drawings that are desired to be used in the description of the embodiments or prior art. Obviously, the drawings in the following description are some embodiments of the present invention, and other drawings may also be obtained according to these drawings without exerting inventive effort by those ordinarily skilled in the art.

Reference signs: 100—cable winch system; 101—winch; 102—cable; 103—telescopic crane; 104—driving end; 105—guide ring; 106—bearing head; 200—mounting frame; 201—load-bearing head connector; 202—fixing bracket; 212—first mounting bracket; 222—second mounting bracket; 232—third mounting bracket; 242—frame connector; 203—inertial navigation system mounting fixture; 204—upper launch LADCP mounting fixture; 205—water sampling controller mounting base; 206—water bottle mounting base; 207—lower launch LADCP mounting fixture; 208—conductivity-temperature depth profiler mounting base; 209—USBL beacon mounting fixture; 210—counterweight mounting stem; 300—LADCP system; 400—USBL beacon; 500—correction system; 501—conductivity-temperature depth profiler; 502—inertial navigation system; 600—water sampler; 601—water bottle; 602—water sampling controller; 700—counterweight; 800—telescopic mechanism; 900—transducer array; 110—research vessel; 111—dynamic positioning system.

DESCRIPTION OF THE EMBODIMENTS

A clear and complete description of the technical solution of the present invention will be made below in conjunction with the drawings. Obviously, the described embodiments are part of the embodiments of the present invention, but not all of them. Based on the embodiments of the present invention, all other embodiments obtained by those ordinarily skilled in the art without exerting creative effort fall within the scope of protection of the present invention.

Figure 1:
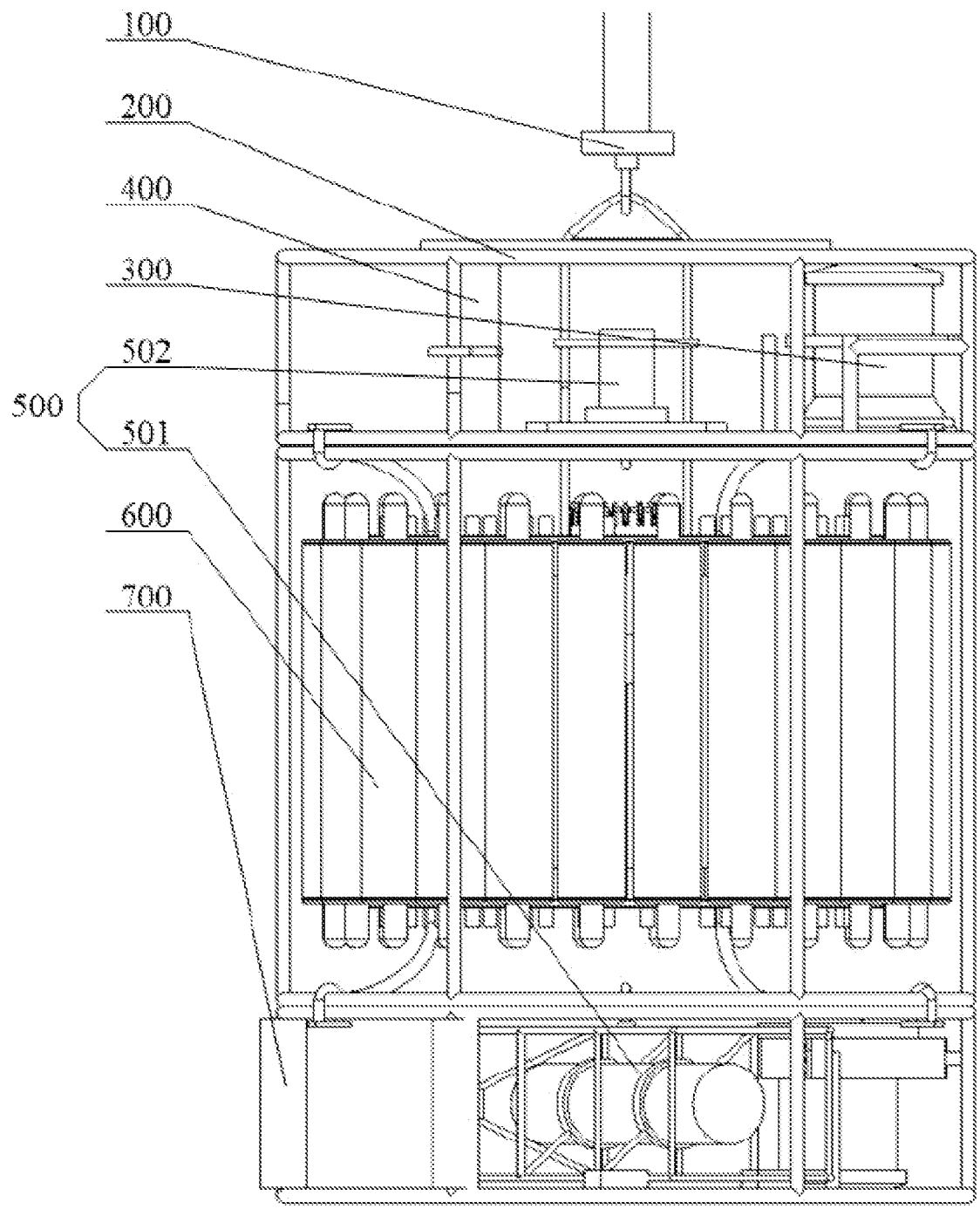
FIG. 1 is a schematic diagram of an overall structure of a LADCP and USBL combined observation device provided by an embodiment of the present invention.
Figure 2:
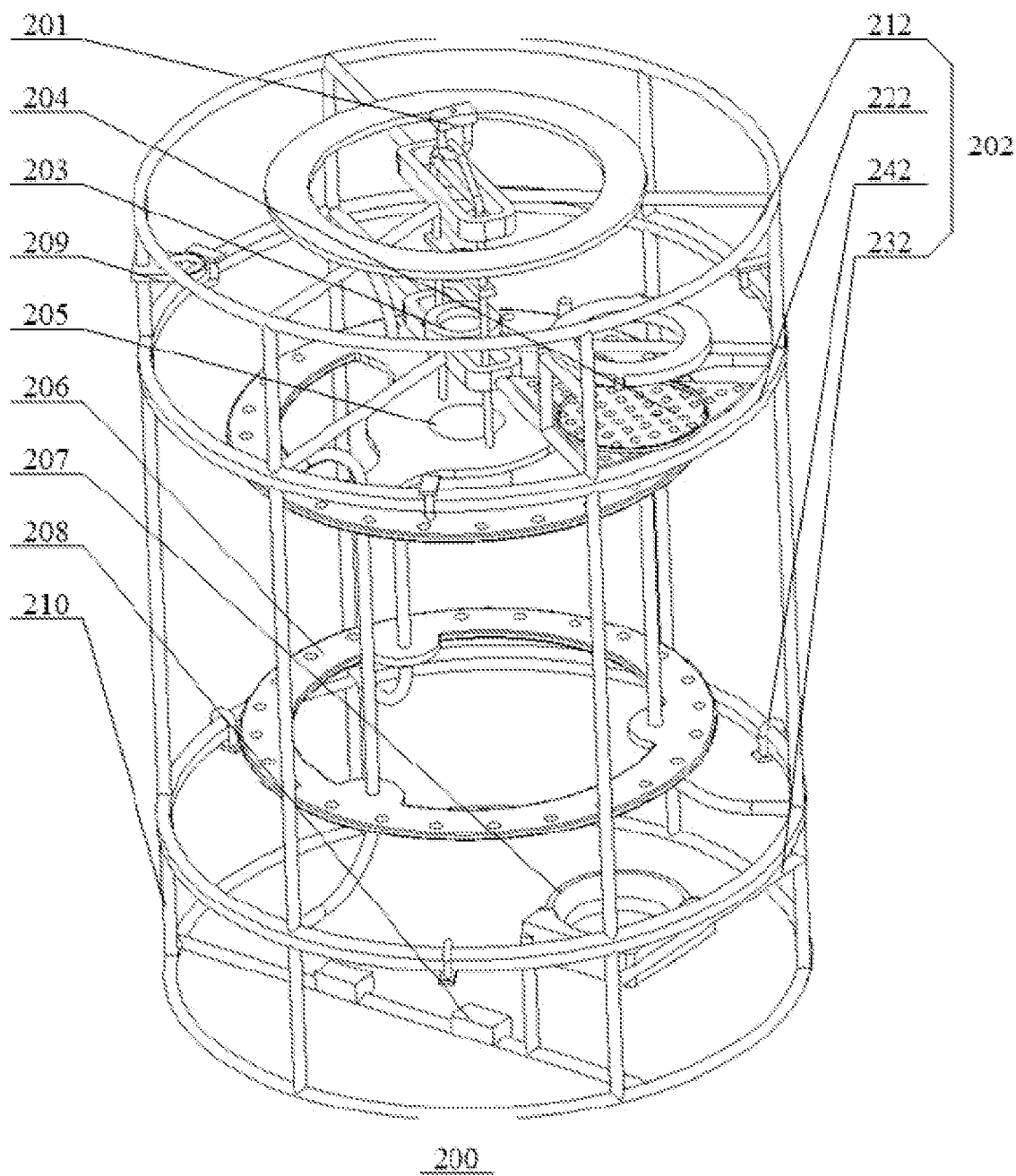
FIG. 2 is a structural schematic diagram of a mounting frame of the LADCP and USBL combined observation device provided by an embodiment of the present invention.
Figure 3:
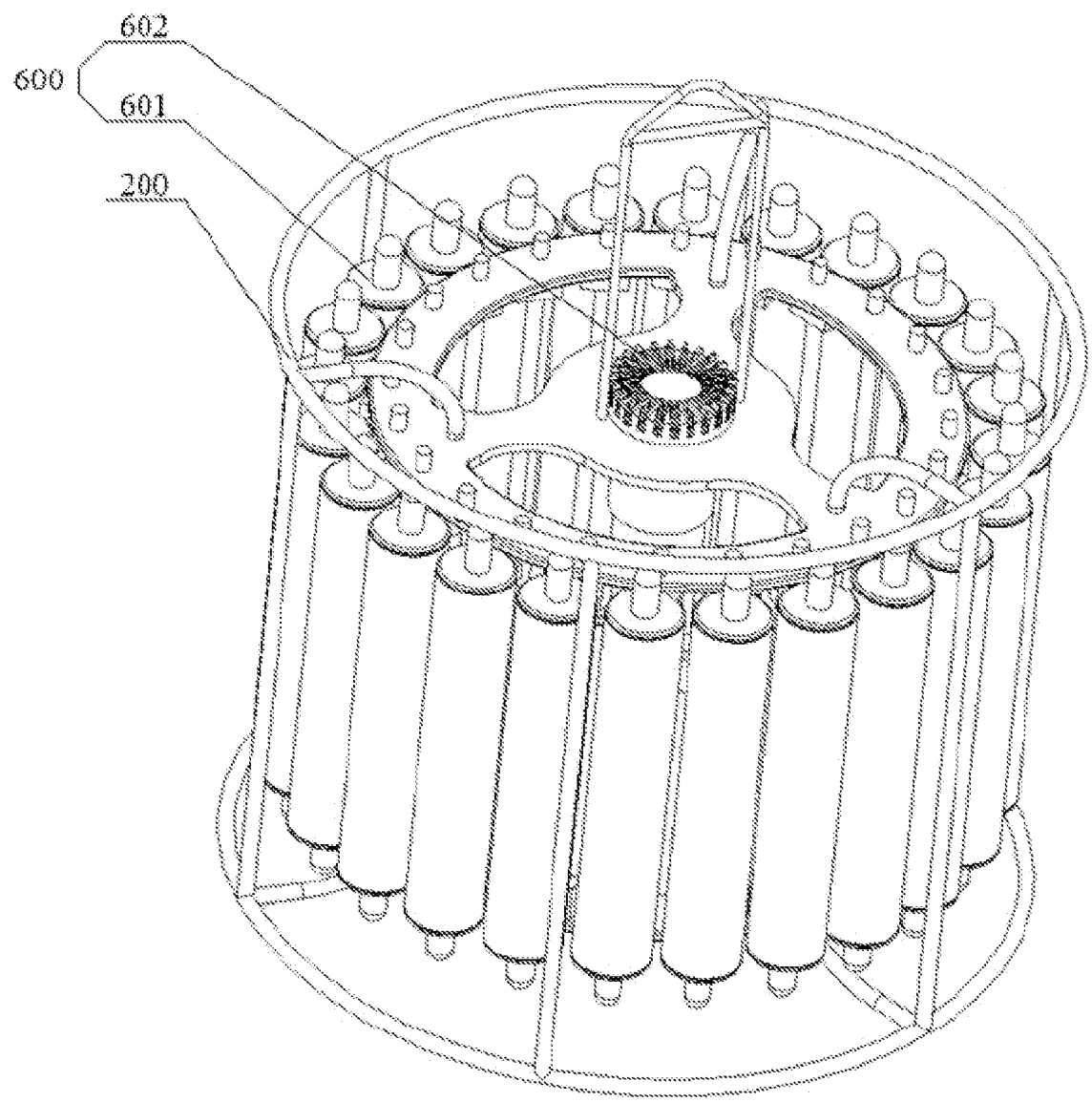
FIG. 3 is a structural schematic diagram of a water sampler of the LADCP and USBL combined observation device provided by an embodiment of the present invention.
Figure 4:
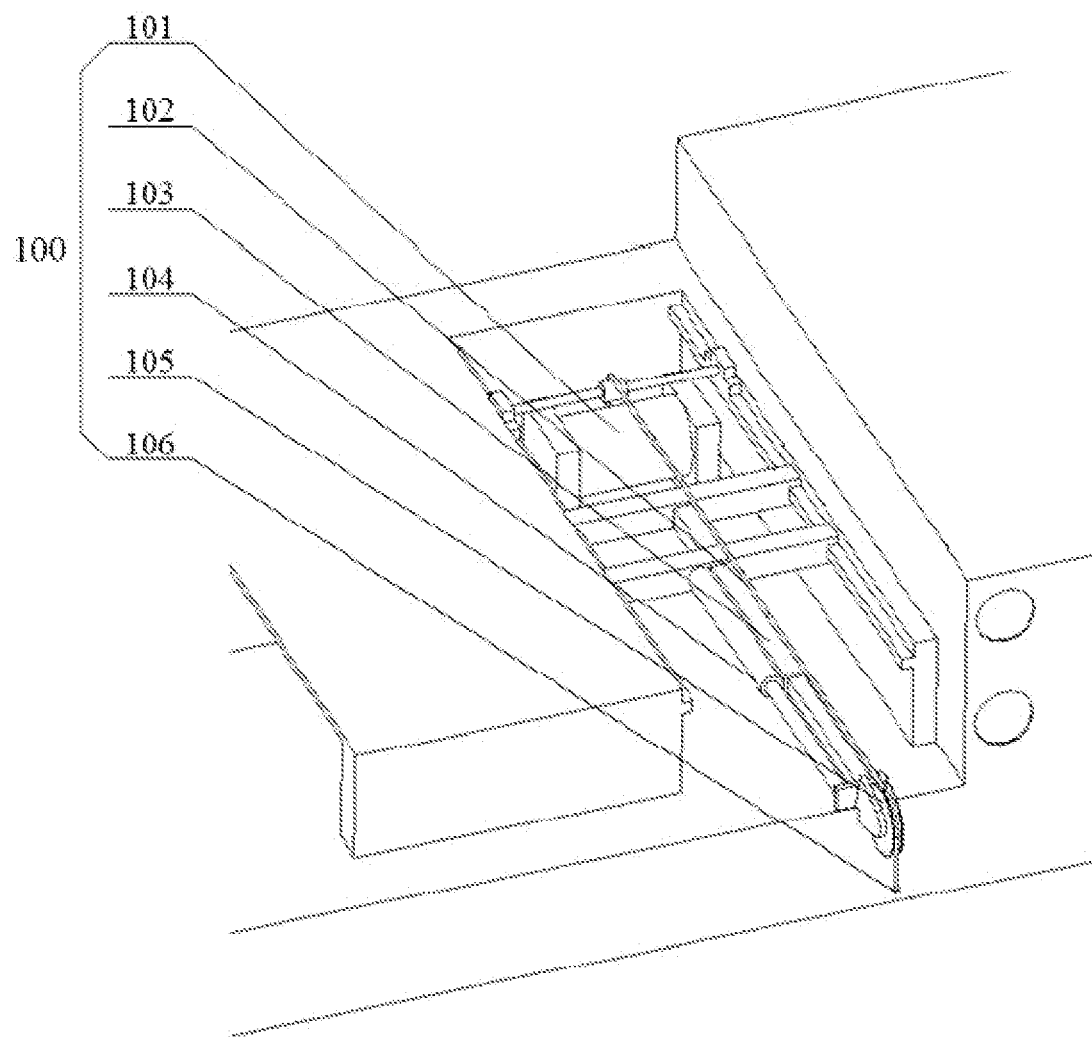
FIG. 4 is a structural schematic diagram of a cable winch system of the LADCP and USBL combined observation device provided by an embodiment of the present invention.
Figure 5:
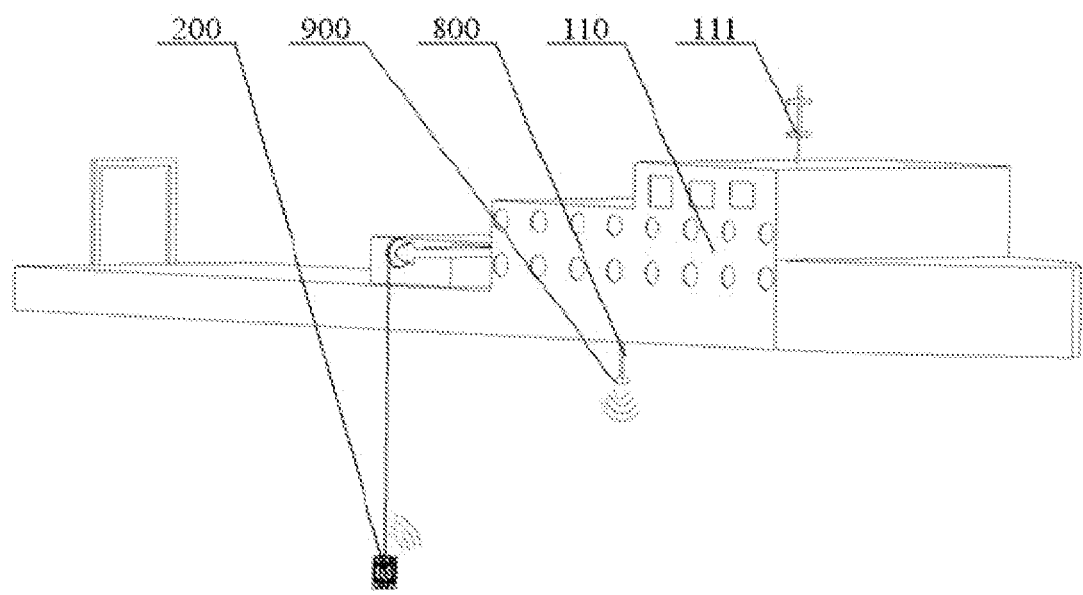
FIG. 5 is a structural schematic diagram of the LADCP and USBL combined observation device provided by an embodiment of the present invention located on a research vessel.

As shown in FIG. 1-5, the LADCP and USBL combined observation device provided by this embodiment for installation on the research vessel 110, includes: a cable winch system 100, a mounting frame 200, a LADCP system 300, a USBL beacon 400 and a correction system 500. The LADCP system 300, the USBL beacon 400, and the correction system 500 are all mounted to the mounting frame 200. The cable winch system 100 is disposed on the research vessel 110. The cable winch system 100 is connected to the mounting frame 200. The cable winch system 100 is used to drive the mounting frame 200 into the seabed in a vertical direction to drive the LADCP system 300 to deploy and recover along the vertical profile. The LADCP system 300 is used to obtain the velocity of a single small section of the current. The USBL beacon 400 is used to locate the underwater position information, and the correction system 500 is used to obtain the data information of the seawater where the mounting frame 200 is located, so as to calculate the absolute current velocity according to the velocity obtained by the LADCP and the current data obtained by the correction system 500.

It should be noted that the LADCP and USBL combined observation device provided in this embodiment can transport the LADCP system 300, the USBL beacon 400 and the correction system 500 to seawater by using the cable winch system 100 and the mounting frame 200, wherein the USBL (Ultra Short Baseline Positioning system) beacon is an underwater positioning technology, which can provide accurate positioning information for underwater survey equipment. LADCP is a new current profile measurement method which appeared in 1990s, is a special ADCP (Acoustic Doppler Current Profiler). The correction system 500 can obtain water depth and angle information in the seawater where the whole equipment is located. The LADCP system 300 receives and processes echo signals from the seabed to track the movement of the river bottom, and the LADCP system 300 acquires relevant data of observed currents to calculate the velocity of current. The USBL beacon 400 can obtain the data of the position trajectory of LADCP system 300 moving with time. By summarizing the above data and correcting the azimuth angle, the direction of the moving speed of LADCP can be obtained. Combined with quality control, the moving speed of LADCP can be determined. Combined with the current data measured by LADCP, the absolute current speed can be accurately calculated.

The present invention provides a LADCP and USBL combined observation device for installation on a research vessel 110, the device includes a cable winch system 100, a mounting frame 200, a LADCP system 300, a USBL beacon 400 and a correction system 500. The LADCP system 300, USBL beacon 400 and correction system 500 can be mounted to the mounting frame 200 by adopting hardware support platform and are arranged on the research vessel 110 by using the cable winch system 100. The cable winch system 100 is connected to the mounting frame 200 and can drive the LADCP system 200 to go deep into the seabed along the vertical section, thereby driving the LADCP system 300 to deploy or recover along the vertical section. Specifically, the LADCP system 300 is used to obtain the current velocity of a single small profile, and the USBL beacon 400 can locate the underwater position information, and the correction system 500 can obtain data information in the seawater where the mounting frame 200 is located, so as to calculate an absolute current velocity according to the velocity obtained by the LADCP system and the current data obtained by the correction system 500. The moving speed of that LADCP is accurately given, the accuracy of ocean current speed calculation is improved. The present invention alleviates the technical problem in the prior art that a moving speed of the LADCP system cannot be accurately given, resulting in large calculation error of current velocity.

Further on the basis of the above embodiments, in the preferred embodiment of the present invention, the correction system 500 includes a conductivity-temperature depth profiler 501 and an inertial navigation system 502. The conductivity-temperature depth profiler 501 and the inertial navigation system 502 both are mounted to the mounting frame 200. The conductivity-temperature depth profiler 501 is used for measuring a temperature value, a salinity value, and a water depth value of a seawater profile during deployment and recovery of the mounting frame 200, and the inertial navigation system 502 is used for measuring a rotation angle of the LADCP system 300 during deployment and recovery processes.

Alternatively, the conductivity-temperature depth profiler 501 is a water quality meter dedicated to long-term on-line monitoring. It is mainly used for long-term on-line observation of biogeochemical parameters in coastal ecosystems. The measurement parameters include temperature, conductivity, pressure, salinity, depth, and dissolved oxygen. In this embodiment, the temperature and salinity values of the seawater profile during deployment and recovery can be measured by using the conductivity-temperature depth profiler 501, and the working water depth values can be provided for the LACDP system and the USBL beacon 400.

The inertial navigation system 502 (INS) is an autonomous navigation system which does not depend on external information or radiate energy to the outside. The inertial navigation system 502 can obtain the velocity, yaw angle and position information in the navigation coordinate system. In this embodiment, the rotation angle of the whole system caused by external force such as current during the deployment and recovery processes of the LADCP system 300 is measured by using the inertial navigation system 502.

In this embodiment, when the data is acquired by the LADCP system 300, the USBL beacon 400, the conductivity-temperature depth profiler 501, and the inertial navigation system 502, a fitting curve can be determined according to the above data information. Specifically, the steps of determining the fitting curve include: determining an azimuth deviation between the motion data of the echo signal from the seabed and the position trajectory data of the near-bottom layer, carrying out linear fitting to the azimuth deviation, determining the fitting curve, calculating the azimuth deviation between the moving speed of the instrument measured by near-bottom USBL and tracked by LADCP bottom, and obtaining the azimuth deviation between the two; and the correcting azimuth angle of the position trajectory data of the whole depth profile according to the fitting curve.

In a preferred embodiment of the present invention, the device also includes a water sampler 600. A plurality of water samplers 600 are provided, the plurality of water samplers 600 are respectively mounted to the mounting frame 200, and the plurality of water samplers 600 are respectively used for sampling seawater at plurality of depth positions.

In a preferred embodiment of the present invention, the water sampler 600 includes a water bottle 601 and a water sampler controller 602. A plurality of water bottles 601 are provided, and the plurality of water bottles 601 are respectively connected to a water sampling controller 602 for adjusting each water bottle 601 to be opened sequentially so as to sample seawater at the plurality of depth positions through the plurality of water bottles 601.

In this embodiment, the water bottle 601 may be a cylindrical water bottle 601. The number of water bottles 601 may be 24. The collection volume of the water bottle 601 may be 10 liters and has on-pressure-keeping airtight design. The water sampling controller 602 controls the water bottles 601 to complete seawater sampling, wherein the water sampling controller 602 may adopt a pressure switch, and by mounting a plurality of water bottles 601 in a radial shape on the mounting frame 200, different water bottles 601 are switched and controlled by the pressure switch, so that seawater sampling at different depths can be completed during the lifting process of the mounting frame 200. Alternatively, the water sampler 600 may be a Nansen water sampler.

In a preferred embodiment of the present invention, the mounting frame 200 includes a load-bearing head connector 201 and a fixing bracket 202, and an inertial navigation system mounting fixture 203, an upper launch LADCP mounting fixture 204, a water sampling controller mounting base 205, a water bottle mounting base 206, a lower launch LADCP mounting fixture 207, a conductivity-temperature depth profiler mounting base 208 and a USBL beacon mounting fixture 209 mounted inside the fixing bracket 202. The load-bearing head connector 201 is located at an end portion of the fixing bracket 202, and the cable winch system 100 is connected to the fixing bracket 202 through the load-bearing head connector 201. Two groups of LADCP systems 300 are provided, and the two groups of LADCP systems 300 are mounted to the upper launch LADCP mounting fixture 204 and the lower launch LADCP mounting fixture 207, respectively. The inertial navigation system is mounted to the inertial navigation system mounting fixture 203, the conductivity-temperature depth profiler 501 is mounted to the conductivity-temperature depth profiler mounting base 208, and the USBL beacon 400 is mounted to the USBL beacon mounting fixture 209. A number of the water bottle mounting bases 206 is identical to the number of the water bottles 601, a plurality of water bottle mounting bases 206 are uniformly arranged along a circumference of the fixing bracket 202, the water bottles 601 is vertically mounted to the water bottle mounting bases 206, and inlets of the water bottles 601 opened at one end of the fixing bracket 202 close to the load-bearing head connector 201, the water sampling controller mounting base 205 is located at one end of the fixing bracket 202 close to the load-bearing head connector 201, and the water sampling controller 602 is mounted to the water sampling controller mounting base 205 so that the water sampling controller 602 is connected to the inlets of the water bottles 601.

In this embodiment, the fixing bracket 202 may adopt a cylindrical frame structure, the fixing bracket 202 may have a plurality of cross beams and vertical beams, all underwater measuring equipment is mounted inside the fixing bracket 202, and the frame structure also provides safety protection for underwater equipment.

In a preferred embodiment of the present invention, the fixing bracket 202 includes a first mounting bracket 212, a second mounting bracket 222, a third mounting bracket 232 and a frame connector 242. The first mounting bracket 212, the second mounting bracket 222 and the third mounting bracket 232 are sequentially connected through the frame connector 242, and the first mounting bracket 212 is connected to the load-bearing head connector 201. The inertial navigation system mounting fixture 203 is located in the middle of the first mounting bracket 212, and the upper launch LADCP mounting fixture 204 and the USBL beacon mounting fixture 209 are respectively located at two sides inside the first mounting bracket 212. The water sampling controller mounting base 205 is located in the middle of the second mounting bracket 222, and the water bottle mounting bases 206 are uniformly arranged along the circumferential direction of the second mounting bracket 222. The lower launch LADCP mounting fixture 207 and the conductivity-temperature depth profiler mounting base 208 are located inside the third mounting bracket 232, and the lower launch LADCP mounting fixture 207 and the upper launch LADCP mounting fixture 204 are arranged correspondingly along a vertical direction.

In this embodiment, the first mounting bracket 212, the second mounting bracket 222, and the third mounting bracket 232 constitute the main load-bearing structure of the mounting frame 200. The first mounting bracket 212, the second mounting bracket 222, and the third mounting bracket 232 may be connected through a plurality of frame connectors 242. The first mounting bracket 212 has an inertial navigation system mounting fixture 203 mounted in the center, an upper launch LADCP mounting fixture 204 mounted to the right side, and a USBL beacon mounting fixture 209 mounted to the left side. The middle part of the second mounting bracket 222 is a water sampling controller mounting base 205 and a water bottle mounting base 206, and the water sampler 600 and the water sampling controller 602 are mainly mounted. The third mounting bracket 232 is mounted with a conductivity-temperature depth profiler mounting base 208 in the middle, a lower launch LADCP mounting fixture 207 on the right side, and a counterweight 700 on the left side.

In the preferred embodiment, the device further includes a counterweight 700. The mounting frame 200 further includes a counterweight mounting stem 210 arranged inside the third mounting bracket 232, the counterweight 700 is mounted to the counterweight mounting stem 210, and the counterweight 700 is configured for balancing a position of the counterweight mounting stem 210 arranged inside the mounting frame 200. The counterweight 700 is detachably connected to the mounting frame 200 and the counterweight 700 can be selected according to different use environments.

In a preferred embodiment of the present invention, the cable winch system 100 includes a winch 101, a cable 102, a telescopic crane 103, a driving end 104, a guide ring 105, and a carrier head 106. Both ends of the cable 102 are respectively connected to the winch 101 and the carrier head 106 which is connected to a mounting frame 200. The winch 101, the telescopic crane 103 and the driving end 104 are all located on the research vessel 110. One end of the telescopic crane 103 is connected to the guide ring 105. The driving end 104 is connected to one end of the telescopic crane 103 near the guide ring 105, and the arrangement direction of the telescopic crane 103 is the same as the extension direction of the cable 102. The driving end 104 is used to drive the telescopic crane 103 to reciprocate to drive the guide ring 105 to extend out of the deck of the research vessel 110. The guide ring 105 is connected to the cable 102, and the cable 102 is used to be vertically arranged in seawater along with the guide ring 105.

In this embodiment, the winch 101 may employ an 8000-meter straight-pull winch, can provide vertical lifting drive for the mounting frame 200 and the overall apparatus. The cable 102 may be a 9.53 mm armored coaxial cable. The 9.53 mm armored coaxial cable may include an electrical conductor, an insulating filler and a metal armored layer. The metal armored layer consists of high-strength galvanized steel wire, can bear most of the working tension of the cable, thereby cooperating with the winch 101 to achieve the underwater retraction of the whole equipment. The electrical conductor can achieve the power, control and data signal transmission between the scientific research instrument and the research vessel 110, and achieve the control and data acquisition of the underwater equipment by the research vessel 110. One end of the 9.53 mm armored coaxial cable is connected to the indoor control system, and the other end is connected to the underwater equipment. The telescopic crane 103 is capable of securely transporting the mounting frame 200 and the whole equipment to the sea surface outside the operation deck. The driving end 104 can adopt a hydraulic cylinder, which can push the telescopic crane 103 to reciprocate, thus driving the telescopic crane 103 to extend or retract to the deck. The guide ring 105 changes the 9.53 mm armored coaxial cable from horizontal direction to vertical direction, and the bearing head 106 connects the 9.53 mm armored coaxial cable and the mounting frame 200.

In a preferred embodiment of the present invention, the device further includes a telescopic mechanism 800 and a transducer array 900. The transducer array 900 is connected to the seawater side of the research vessel 110 through the telescopic mechanism 800, the telescopic mechanism 800 is used for adjusting the position of the transducer array 900 in the seawater, and the transducer array 900 is used for positioning the USBL beacon 400 underwater to obtain the position information.

In this embodiment, the transducer array 900 and the USBL beacon 400 form a USBL system, and the transducer array 900 is composed of one emitting transducer primitive and four receiving transducer primitives. The USBL system emitting primitives emit acoustic signals, and when the USBL beacon 400 receives the emitting primitive signals, it emits response signals, and four receiving transducer primitives of the transducer array 900 receive the response signals. An oblique distance of the target is calculated by measuring the acoustic wave propagation time from the USBL beacon 400 to the transducer array 900. The relative position of the USBL beacon 400 with respect to the transducer array 900 is determined by measuring the phase difference of sound waves from the USBL beacon 400 to the transducer array 900, and then the underwater coordinates of the USBL beacon 400 are calculated by combining the position, attitude and heading provided by the external GPS (Global Positioning System), attitude sensor and compass.

It should be noted that the USBL system can use the dynamic positioning system 111 of the research vessel 110, the transducer array 900 and the indoor control system of the research vessel 110, and use the USBL system to position the underwater position of the LADCP system 300 on the premise that the position of the marine comprehensive research vessel remains unchanged. The dynamic positioning system 111 is the power system of the research vessel 110 itself, which includes the research vessel power system and GPS navigation and positioning system. The transducer array 900 can be mounted in the middle of the research vessel 110 through the telescopic mechanism 800. The telescopic mechanism 800 is used for changing the underwater operation position of the transducer array 900, and the transducer array 900 is used for positioning the underwater position of the USBL beacon 400. The telescopic mechanism 800 is retracted during non-positioning operation, the transducer array 900 is flush with the bottom of the research vessel 110, and the telescopic mechanism 800 extends out to extend the transducer array 900 out of the bubble layer of the bottom during positioning operation. Alternatively, the telescopic mechanism 800 may employ a telescopic rod.

In this embodiment, the assembly method of the LADCP and USBL combined observation device includes the following steps: 1. assembly of the equipment on the first mounting bracket 212 by first placing the first mounting bracket 212 horizontally on the operation deck, then opening the inertial navigation system mounting fixture 203, the upper launch LADCP mounting fixture 204 and the beacon mounting fixture, followed by mounting the LADCP system 300 to the upper launch LADCP mounting fixture 204 and the USBL beacon 400 to the USBL beacon mounting fixture 209; for the time being, not mounting the inertial navigation system; 2. assembly of the equipment on the second mounting bracket 222 by first mounting the water sampling controller 602 on the water sampling controller mounting base 205, followed by sequentially mounting a plurality of water bottles 601 on the water bottle mounting base 206; 3. assembly of equipment on the third mounting bracket 232 by first mounting the conductivity-temperature depth profiler 501 on the conductivity-temperature depth profiler mounting base 208, followed by mounting the LADCP system 300 on the lower launch LADCP mounting fixture 207, and finally mounting counterweights 700 on the counterweight mounting stem 210; 4. connecting the second mounting bracket 222 and the third mounting bracket 232 with the frame connector 242, with the third mounting bracket 232 at bottom and the second mounting bracket 222 at top when connecting, in such a way vertical rods of the mounting frame 200 are aligned; and 5. the center of the first mounting bracket 212 passing through the load-bearing head connector 201 and being mounted to a top end of the second mounting bracket 222, then being fixed by the frame connector 242, and finally mounting the inertial navigation system by the inertial navigation system mounting fixture 203.

The present embodiment provides a method of applying the LADCP and USBL combined observation device, including: assembling the LADCP and USBL combined observation device; testing a cable winch system 100, a LADCP system 300, a USBL beacon 400, a conductivity-temperature depth profiler 501 and an inertial navigation system 502; completing the test; starting a dynamic positioning system 111 of the research vessel 110 so that a hull of the research vessel 110 is in a state of unchanged position and direction; actuating the telescopic rod to extend a transducer array 900 to an operating state; starting the cable winch system 100 to release the LADCP and USBL combined observation device to a position of 50 meters underwater; testing positioning and communication data information between transducer array 900 and USBL beacon 400, and testing data quality of the LADCP system 300, the conductivity-temperature depth profiler 501, the inertial navigation system 502 and the water sampling controller 602; deploying the LADCP and USBL combined observation device with a descending speed ranging from 20 to 60 m/min after completing the test; stopping descending until the device is deployed to a position 50 meters from seabed, where the LADCP system 300 collects ground tracking data for 5 minutes, and then recovering the device; controlling, by the water sampling controller 600, a plurality of water bottles 601 to sample water in layers during the recovering; recovering the LADCP and USBL combined observation device above sea surface, driving the LADCP and USBL combined observation device to be recovered to a deck of the research vessel 110, recovering the telescopic rod, and shutting down a dynamic positioning system 111 of the research vessel 110; and aggregating USBL positioning data, LADCP current data, sound velocity profile data derived from the conductivity-temperature depth profiler 501 and angle data of the inertial navigation system for data processing.

The present embodiment provides a method for applying the LADCP and USBL combined observation device, which includes a preparation step and a deployment operation step. The preparation step includes: 1.1, placing the assembled LADCP and USBL combined observation device under the telescopic crane 103 of the cable winch system 100, passing the 9.53 mm armored coaxial cable through the guide ring 105, then connecting the 9.53 mm armored coaxial cable with the carrier head 106, and finally connecting the load-bearing head connector 201 with the carrier head 106; 1.2. carrying start-up test of two LADCP systems 300, the inertial navigation system, the USBL beacon 400 and the conductivity-temperature depth profiler 501, and starting the winch 101 and the telescopic crane 103; and carrying out the deployment operation after the above equipment is tested to be normal. The deployment operation step includes: 2.1, opening the dynamic positioning system 111 of the research vessel 110 to make the research vessel 110 in a state where the position and direction are unchanged, and opening the telescopic mechanism 800 to extend the transducer array 900 to the operation state; 2.2. using the driving end 104 to drive the telescopic crane 103 to extend out of the operation deck; the telescopic crane 103 lifting the mounting frame 200 and the whole equipment to the sea surface, and the winch 101 releasing 9.53 mm armored coaxial cable to 50 meters underwater; 2.3. testing the positioning and communication between the transducer array 900 and the USBL beacon 400 after the whole equipment is placed at 50 meters, and testing the data quality of all measuring equipment; 2.4. starting to deploy the whole equipment with a descending speed between 20 m/min and 60 m/min after the test is completed at a water depth of 50 meters, and stopping the descent when it is 50 meters away from the seabed, and recovering after the LADCP system 300 collects the ground tracking data at this position for 5 minutes; 2.5. controlling the water sampling controller 602 to complete the layered water sampling of the water bottle 601 during the overall equipment recovery process; 2.6. after the whole equipment is recovered above the sea surface, retracting the driving end 104 to drive the telescopic crane 103 to retract the operation deck, and followed by the whole equipment into the operation deck, then withdrawing the telescopic mechanism 800, and turning off the dynamic positioning system 111 of the research vessel 110; 2.7. aggregating USBL positioning data, LADCP current data, sound velocity profile data derived from the conductivity-temperature depth profiler 501 and angle data of the inertial navigation system for combined USBL and LADCP observation data processing.

Finally, it should be noted that, the above embodiments are only used to illustrate the technical solution of the present invention and not to limit it. Although the present invention has been described in detail with reference to the foregoing embodiments, it should be understood by those of ordinary skill in the art that the technical solution described in the foregoing embodiments can still be modified or some or all of the technical features thereof can be equivalently replaced. However, these modifications or substitutions do not depart the essence of the corresponding technical solution from the scope of the technical solution of each embodiment of the present invention.

What is claimed is:

1. A Lowered Acoustic Doppler Current Profiler (LADCP) and an Ultrashort Baseline Positioning System (USBL) combined observation device for installation on a research vessel, comprising:
   a LADCP system for obtaining a current velocity of a single small profile;
   USBL beacons for locating underwater position information;
   a mounting frame;
   a cable winch system for driving the mounting frame deep to seabed in a vertical direction to drive the LADCP system to deploy or recover along a vertical profile; and
   a correction system for obtaining information on data in seawater in which the mounting frame is located, to calculate an absolute current velocity based on the current velocity obtained by the LADCP and current data obtained by the correction system, wherein the LADCP system, the USBL beacons and the correction system are mounted to the mounting frame, the cable winch system is arranged on the research vessel, and the cable winch system is connected to the mounting frame;

wherein the correction system comprises a conductivity-temperature depth profiler mounted to the mounting frame and configured for measuring a temperature value, a salinity value and a water depth value of a seawater profile of the mounting frame during deployment and recovery processes and an inertial navigation system mounted to the mounting frame and configured for measuring a rotation angle of the LADCP system during the deployment and recovery processes, to generate angle data of the inertial navigation system;

wherein the mounting frame comprises a load-bearing head connector and a fixing bracket, as well as an inertial navigation system mounting fixture, an upper launch LADCP mounting fixture, a lower launch LADCP mounting fixture, a conductivity-temperature depth profiler mounting base and a USBL beacon mounting fixture mounted inside the fixing bracket;

wherein the load-bearing head connector is located at an end portion of the fixing bracket, and the cable winch system is connected to the fixing bracket through the load-bearing head connector;

wherein two groups of the LADCP system are provided, and the two groups of LADCP systems are mounted to the upper launch LADCP mounting fixture and the lower launch LADCP mounting fixture, respectively; and wherein the inertial navigation system is mounted to the inertial navigation system mounting fixture, the conductivity-temperature depth profiler is mounted to the conductivity-temperature depth profiler mounting base, and the USBL beacons are mounted to the USBL beacon mounting fixture.

2. The LADCP and USBL combined observation device according to claim 1, further comprising a plurality of water samplers respectively mounted to the mounting frame and configured for sampling seawater at a plurality of depth positions.

3. The LADCP and USBL combined observation device according to claim 2, wherein the water samplers comprise a plurality of water bottles and a water sampling controller configured for adjusting sequential opening of each water bottle so as to sample seawater at the plurality of depth positions through the plurality of water bottles, the plurality of water bottles being connected to the water sampling controller, respectively.

4. The LADCP and USBL combined observation device according to claim 3, wherein the mounting frame further comprises a water bottle mounting base and a water bottle;

wherein a number of the water bottle mounting bases is identical to the number of the water bottles, a plurality of water bottle mounting bases are uniformly arranged along a circumference of the fixing bracket, the water bottles are vertically mounted to the water bottle mounting bases, and inlets of the water bottles are opened at one end of the fixing bracket close to the load-bearing head connector, the water sampling controller mounting base is located at one end of the fixing bracket close to the load-bearing head connector, and the water sampling controller is mounted to the water sampling controller mounting base so that the water sampling controller is connected to the inlets of the water bottles.

5. The LADCP and USBL combined observation device according to claim 4, wherein the fixing bracket comprises a first mounting bracket, a second mounting bracket, a third mounting bracket and a frame connector;

wherein the first mounting bracket, the second mounting bracket and the third mounting bracket are sequentially connected through the frame connector, and the first mounting bracket is connected to the load-bearing head connector;

wherein the inertial navigation system mounting fixture is located in a middle of the first mounting bracket, and the upper launch LADCP mounting fixture and the USBL beacon mounting fixture are respectively located at two sides inside the first mounting bracket;

wherein the water sampling controller mounting base is located in a middle of the second mounting bracket, and the water bottle mounting bases are uniformly arranged along a circumferential direction of the second mounting bracket; and wherein the lower launch LADCP mounting fixture and the conductivity-temperature depth profiler mounting base are located inside the third mounting bracket, and the lower launch LADCP mounting fixture and the upper launch LADCP mounting fixture are arranged correspondingly along a vertical direction.

6. The LADCP and USBL combined observation device according to claim 5, further comprising a counterweight; and the mounting frame further comprises a counterweight mounting stem arranged inside the third mounting bracket, the counterweight is mounted to the counterweight mounting stem, and the counterweight is configured for balancing a position of the counterweight mounting stem arranged inside the mounting frame.

7. The combined LADCP and USBL observation device according to claim 1, wherein the cable winch system comprises a winch, a cable, a telescopic crane, a driving end, a guide ring and a bearing head;

two ends of the cable are respectively connected to the winch and the bearing head, and the bearing head is connected to the mounting frame; and the winch, the telescopic crane and the driving end are all located on the research vessel, one end of the telescopic crane is connected to the guide ring, the driving end is connected to one end of the telescopic crane close to the guide ring, an arrangement direction of the telescopic crane is the same as an extension direction of the cable, the driving end is configured to drive the telescopic crane to move reciprocally to drive the guide ring to extend out of a deck of the research vessel, the guide ring is connected to the cable, and the cable is configured to be vertically arranged in seawater along with the guide ring.

8. The combined LADCP and USBL observation device according to claim 1, further comprising a telescopic mechanism and a transducer array, wherein:

the transducer array is connected to a side of the research vessel near the seawater through the telescopic mechanism, the telescopic mechanism is configured for adjusting a position of the transducer array in the seawater, and the transducer array is configured for positioning to obtain position information of the USBL beacons underwater.

9. A method of applying the LADCP and USBL combined observation device according to claim 1, comprising:

assembling the LADCP and USBL combined observation device;

testing a cable winch system, a LADCP system, a USBL beacon, a conductivity-temperature depth profiler and an inertial navigation system;

completing the test;

starting a dynamic positioning system of the research vessel so that a hull of the research vessel is in a state of unchanged position and direction;

actuating a telescopic rod to extend a transducer array to an operating state;

starting the cable winch system to release the LADCP and USBL combined observation device to a position of 50 meters underwater;

testing positioning and communication data information between transducer array and USBL beacon, and testing data quality of the LADCP system, the conductivity-temperature depth profiler, the inertial navigation system and the water sampling controller;

deploying the LADCP and USBL combined observation device with a descending speed ranging from 20 to 60 m/min after completing the test;

stopping descending until a device is deployed to a position 50 meters from seabed, where the LADCP system collects ground tracking data for 5 minutes, and then recovering the device;

controlling, by the water sampling controller, a plurality of water bottles to sample water in layers during the recovering;

recovering the LADCP and USBL combined observation device above sea surface, driving the LADCP and USBL combined observation device to be recovered to a deck of the research vessel, recovering the telescopic rod, and shutting down a dynamic positioning system of the research vessel; and aggregating USBL positioning data, LADCP current data, sound velocity profile data derived from the conductivity-temperature depth profiler and angle data of the inertial navigation system for data processing.

* * * * *